United States Patent [19]

Nakata

[11] 4,040,108
[45] Aug. 2, 1977

[54] MAGNETIC SHEET READER

[75] Inventor: Kazuhiko Nakata, Shimosuwamachi-yashiro, Japan

[73] Assignee: Kabushiki Kaisha Sankyo Seiki Seisakusho, Japan

[21] Appl. No.: 599,490

[22] Filed: July 28, 1975

[30] Foreign Application Priority Data

July 31, 1974  Japan .................................. 49-87652
June 30, 1975  Japan .................................. 50-80622

[51] Int. Cl.² ............................................. G06K 7/08
[52] U.S. Cl. ............................. 360/101; 235/61.11 D; 360/2; 360/83; 360/107
[58] Field of Search ................... 235/61.11 D; 360/2, 360/83, 107, 101

[56] References Cited

U.S. PATENT DOCUMENTS

| | | | |
|---|---|---|---|
| 2,245,286 | 6/1941 | Marzocchi | 360/83 X |
| 3,020,355 | 2/1962 | Moriya | 360/83 |
| 3,105,880 | 10/1963 | Moriya | 360/83 X |
| 3,388,221 | 6/1968 | Johnson | 360/83 R |
| 3,585,316 | 6/1971 | Kuller | 360/83 |
| 3,873,975 | 3/1975 | Mikloj | 235/61.11 D |

*Primary Examiner* — Harold Pitts
*Attorney, Agent, or Firm* — James C. Wray

[57] ABSTRACT

A magnetic sheet or a magnetic slip with a magnetic tape or a magnetic coating on its back is driven intermittently by a sprocket wheel or a long roller. A rotating follower gives tension to the magnetic sheet. Between the follower and the drive roller, a magnetic head comes into sliding contact with the magnetic sheet when it stops for magnetic recording.

23 Claims, 8 Drawing Figures

MAGNETIC SHEET READER

BACKGROUND OF THE INVENTION

The present invention relates to a magnetic sheet reader in which a magnetic sheet, for instance a magnetic slip, provided on its back with a magnetic tape or a magnetic coating is driven intermittently for magnetic recording by a rotator such as a sprocket wheel or a long roller.

In a conventional magnetic sheet, for instance a large number of magnetic slips connected together as a belt, a magnetic body is attached at a specific position on the back of each slip. To make a record on the magnetic body, the belt of magnetic slips has to be driven intermittently at a specific pitch. The slip is liable to get slack, with a resultant shift in the recording position, which adversely affects the subsequent processing. Moreover, when the magnetic head slides along the slip, the frictional force developing between the magnetic head surface and a magnetic stripe on the slip is liable to cause a crumple or a slack on the slip, if the sheet used as the slip is thin, thereby hindering the proper transmission of information.

SUMMARY OF THE INVENTION

The primary object of the present invention is to provide a magnetic sheet reader composed of a rotator for intermittent drive of a magnetic sheet, a rotating follower for giving tension to the magnetic sheet, and a magnetic head for magnetic recording of the magnetic sheet, the magnetic head coming into sliding contact with the magnetic sheet at halt, whereby contact between the magnetic head and a magnetic stripe on the magnetic sheet takes place in exact opposition to each other, and accordingly the magnetic recording action is done reliably.

Another object of the present invention is to provide a magnetic sheet reader which is characterized in addition to the above composition in that a means is provided for pressing the magnetic sheet against a fixed piece just before the action start point of the magnetic head, thereby assuring the sliding movement of the magnetic head without causing a crumple or a slack on the magnetic sheet.

The other objects of the present invention will become more apparent from the following description of an embodiment of the present invention referring to the attached drawings.

BRIEF DESCRIPTION OF THE DRAWINGS

FIG. 2 (b) shows the back of the magnetic sheet.

DETAILED DESCRIPTION OF PREFERRED EMBODIMENT

Figure 1:
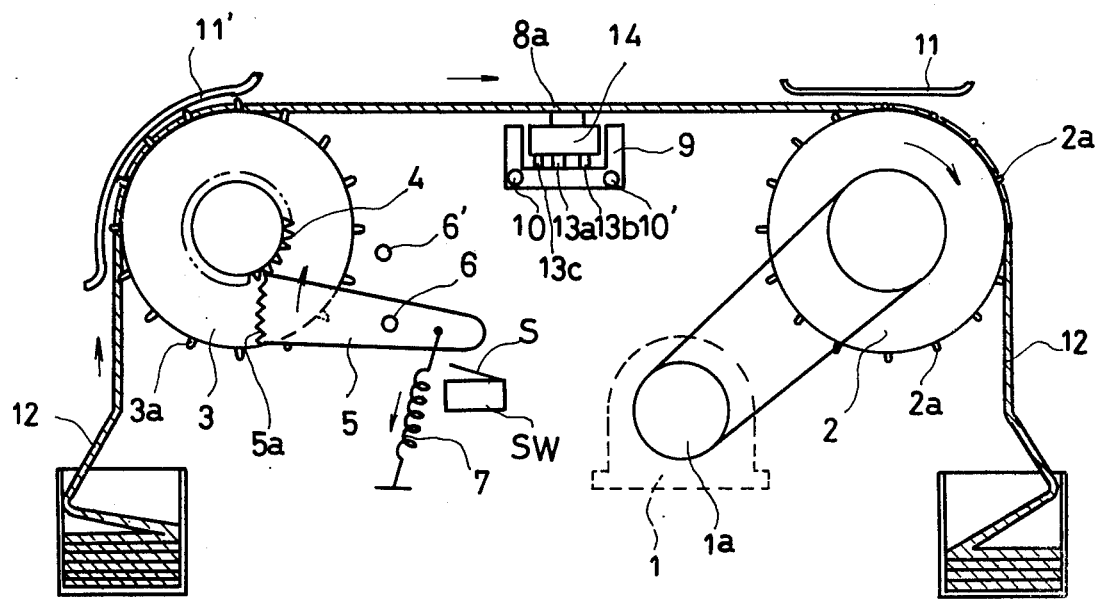
FIG. 1 is a schematic diagram explaining a magnetic sheet reader as one embodiment of the present invention.

Referring to the drawings, a preferred embodiment of the present invention is described.

In the drawings, referring to FIG. 1, the numeral 1 represents a stepping motor. Shaft pulley 1a on stepping motor 1 intermittently drives a belt, which in turn moves drive rotator 2 intermittently. Drive rotator 2 is here represented as a sprocket wheel with a plurality of pawls 2a, but rotator 2 may be a combination of a long roller and an opposed pinch or press roller.

Adequately spaced from drive rotator 2 there is provided a rotating follower 3 with its rotating axis in parallel to rotator 2. Rotating follower 3 is here represented as a sprocket wheel with a plurality of pawls 3a. Follower 3 may be, just as the above-mentioned drive rotator, a combination of a long roller and a press roller.

Rotating follower 3 is provided with a coaxial gear 4, and a tension lever 5, having at its tip a partial gear 5a, which meshes with gear 4. Tension lever 5 is rotatably supported on a stationary shaft 6. Spring 7 urges tension lever 5 to turn counterclockwise around shaft 6 to give a continuous counterclockwise torque to rotating follower 3 via gears 5a and 4. A motor with a weak torque or a simple frictional mechanism such as a frictional brake may be applied.

Sliding block 9 with a magnetic head 8 is provided between drive rotator 2 and rotating follower 3. Supporting rods 10 and 10' run through said sliding block 9. Rods 10 and 10' are arranged parallel to the rotating axis of rotator 2 and follower 3. Sliding block 9 is slidably held on rods 10 and 10', and sliding block 9 is movable along rods 10 and 10' by a motor which is not shown.

Figure 5:
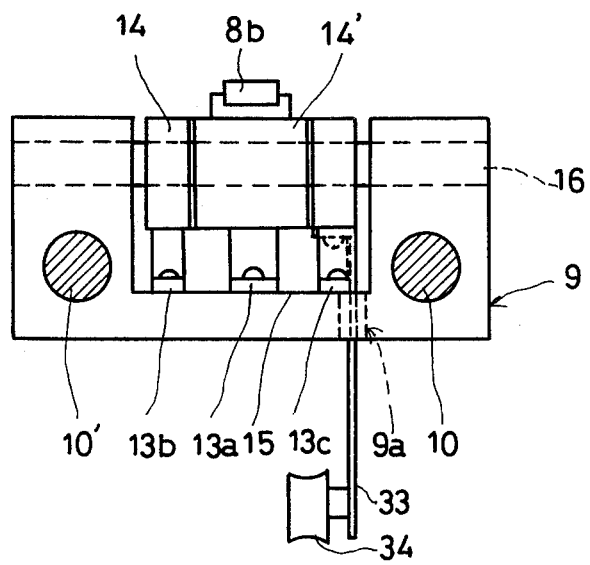
FIG. 5 is a side view of the sliding block.
Figure 6:
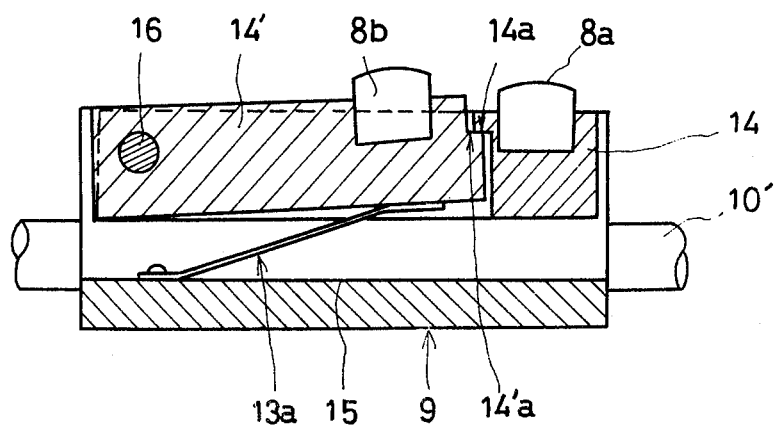
FIG. 6 is a sectional view along V — V of FIG. 4.

Sliding block 9 is internally loaded with leaf springs 13a, 13b, 13c to urge head holder 14 upward. As shown in FIGS. 5 and 6 spring 13a urges internal head holder 14' upward. Springs 13b and 13c urge external head holder 14 upward.

SW is a microswitch for empty detection. Operating contact S of switch SW is fitted close to the end of tension lever 5 near spring 7. Stopper pin 6' stops clockwise movement of tension lever 5 to prevent an excessive load from acting on microswitch SW. Guide plates 11 and 11' apply a light pressure to magnetic sheet 12 on rotator 2 and follower 3, respectively.

To charge a thus constituted magnetic sheet reader with a magnetic sheet 12, as illustrated in FIG. 1, the back of magnetic sheet 12 is contacted with rotator 2 and follower 3, with pawls 2a, 3a inserted into numerous holes 12d formed on both edges of the magnetic sheet 12. A light pressure is applied by gude plates 11 and 11'.

Figure 2A:
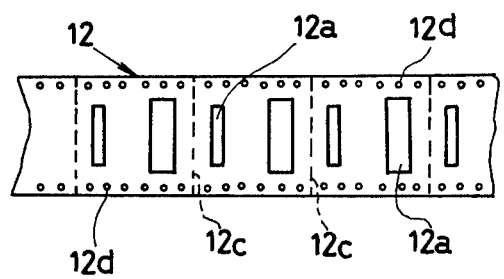
FIG. 2 (a) shows the top of a magnetic sheet.
Figure 2B:
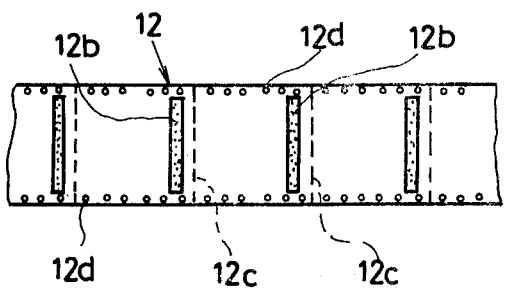

As shown in FIGS. 2 (a) and 2(b) the contents of an order and other necessary matters are printed in areas 12a on the top surface of magnetic sheet 12 by a line-printer through a computer or the like which is not shown. The back of magnetic sheet 12 has magnetic stripes 12b, i.e., a magnetic recording medium pasted thereon. A series of magnetic slips are attached continuously, with perforated boundaries 12c between the slips. Intermittent movement at a specific pitch of one slip portion, i.e., the portion from one perforation 12c to the next perforation 12c, is effected by drive rotator 2, which is intermittently driven by stepping motor 1.

When rotator 2 is driven to rotate, a tension acting on magnetic sheet 12 moves magnetic sheet 12 to the right as shown in the drawing, causing follower 3 to rotate counterclockwise. Tension lever 5, overcoming the force of spring 7, escapes downward in the drawing, whereby partial gear 5a does not mesh with the gear 4 of the follower 3.

when rotator 2, after having turned through an angle corresponding to one slip portion, comes to a halt, tension ceases to act on magnetic sheet 12, causing magnetic sheet 12 to stop. Follower 3 stops rotating; thereupon, tension lever 5 under the action of spring 7 turns clockwise around the stationary shaft 6. As the result, partial gear 5a of tension lever 5 meshes with gear 4, and a counterclockwise torque comes to act on follower 3. Therefore, follower 3 gives a back tension, i.e., a tension reverse to the moving direction to magnetic sheet 12, thereby stopping it and at the same time stretching it.

When magnetic sheet 12 is stopped and stretched, sliding block 9 slides at a constant speed on rods 10 and 10', while the magnetic heads 8a and 8b shown in FIG. 6 magnetically record the necessary data in sliding contact with magnetic stripe 12b on the back of magnetic sheet 12.

More description is to be made of this magnetic recording action in the following description which relates to FIGS. 4, 5 and 6. Sliding block 9 is freely slidable along rods 10 and 10'. Sliding block 9 is a block with a U-shaped section having a central channel 15. Within channel 15 there are housed internal head holder 14' and external head holder 14, which are fitted respectively by means of support 16 to sliding block 9. Internal head holder 14' and external head holder 14 are equipped respectively with magnetic heads 8b, 8a.

Three leaf springs 13a, 13b, 13c are provided at the bottom of channel 15. Spring 13a urges internal head holder 14' to turn counterclockwise around support 16. Springs 13b and 13c urge external head holder 14 to turn counterclockwise around support 16. At the end of internal head holder 14' an engaging step 14'a is formed as a projection. At the end of the external head holder 14 an engaging step 14a is formed as a complementary projection. Steps 14'a and 14a continuously engage under the influence of the elasticity of springs 13a, 13b, 13c. Thus, in a normal state it is important for normal transmission of information that, as illustrated in FIG. 6, magnetic head 8b juts above the magnetic head 8a.

A roller holder 33 is attached to the bottom of the external head holder 14. On the inside of the roller holder 33 a roller 34 is rotatably pivoted. Roller holder 33 and roller 34 pivoted thereto protrude through notch 9a cut on the sliding block 9, downward below the level of the sliding block 9. It is not always necessary that the roller 34 is rotatable; any material with a low frictional coefficient will do.

Figure 3:
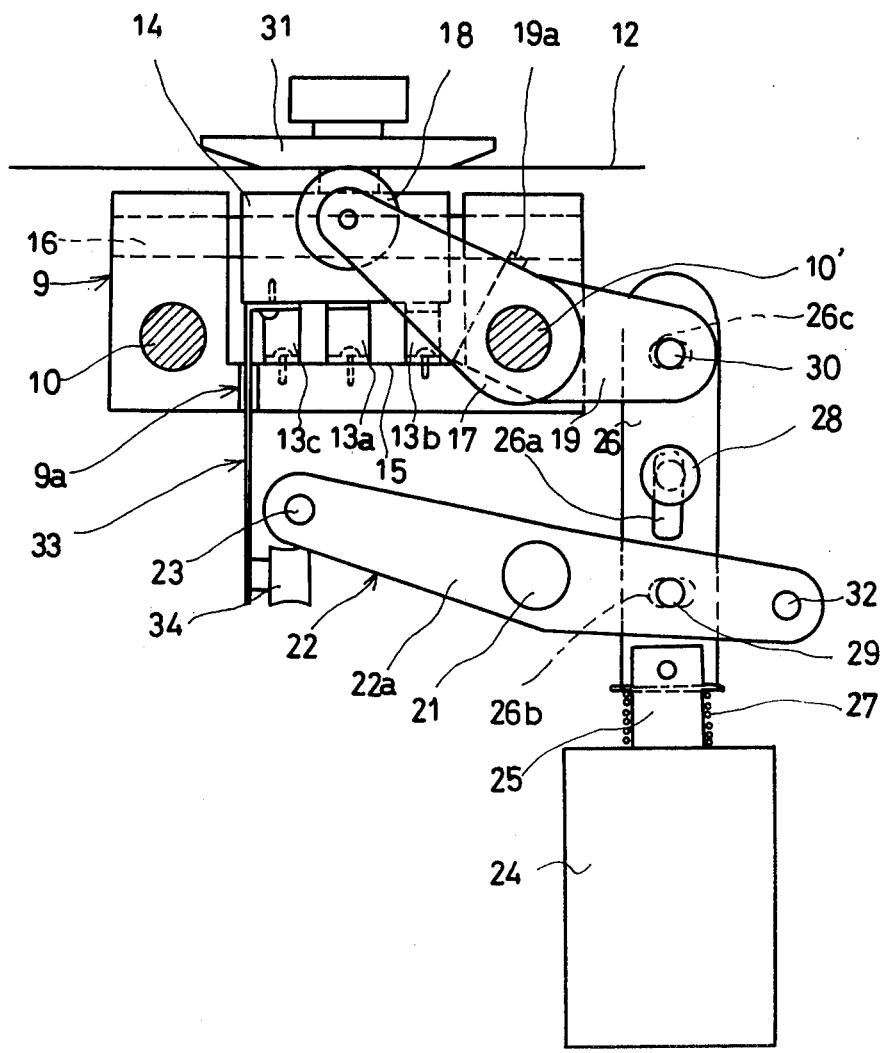
FIG. 3 is a diagram explaining the action of the magnetic sheet reader.

As shown in FIG. 3 a roller-holding lever 17 is rotatably fitted at an appropriate position on support 10', entirely independent of the sliding block 9. At the tip of said lever 17 a press roller 18 is pivoted. The press roller 18, at the sheet-fixing position indicated in FIG. 3, lies on the same axis as the magnetic heads 8a, 8b.

Figure 4:
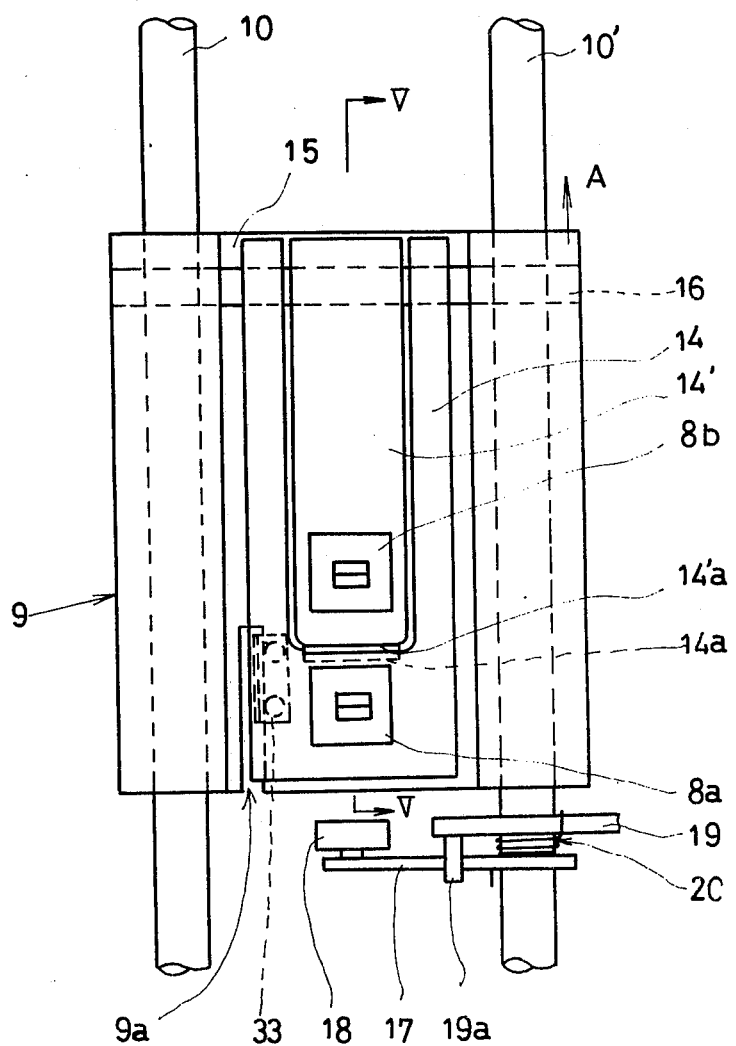
FIG. 4 is a plan view of a sliding block.

As shown in FIG. 4 a control lever 19 is rotatably fitted on support 10', close to and parallel to the roller-holding lever 17. A projection 19a, integrally formed on the control lever 19, is provided on the top of the roller-holding lever 17. Between the roller-holding lever 17 and the control lever 19 a coil spring 20 is interposed. The elasticity of spring 20 continuously urges the roller-holding lever 17 toward the top as shown in FIG. 3.

Figure 7:
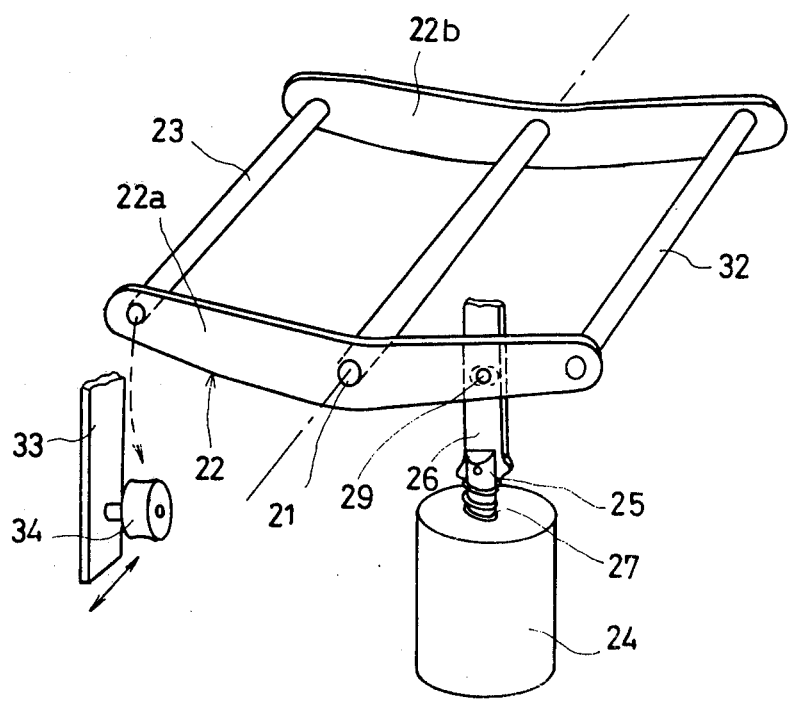
FIG. 7 is a diagram explaining the action of a vibrating framework.

As shown in FIGS. 3 and 7, a vibrating framework 22 is supported on the rotating shaft 21 below support 10'. Vibrating framework 22 consists of two parallel plates 22a and 22b, a roller guide bar 23 running normal to plates 22a and 22b, and a balancing bar 32 running parallel to roller guide bar 23. Roller guide bar 23 is parallel to the rods 10 and 10'.

The plunger 25 of a solenoid 24 is equipped with a connecting member 26. A coil spring 27 comes between connecting member 26 and the top of solenoid 24. Thus, when solenoid 24 is not energized, connecting member 26 is urged upward. The connecting member 26, being guided by a slot 26a bored therein and a guide pin 28 inserted in said slot 26a, is vertically movable.

The connecting member 26 has other slots 26b and 26c. Slot 26b and vibrating framework 22 are connected together with a pin 29, and slot 26c and control lever 19 are connected together by a pin 30.

Fixed piece 31 applies downward pressure above magnetic sheet 12. Fixed piece 31 represents a long body extending over the entire moving range of the magnetic heads 8a and 8b.

The function of the magnetic sheet reader is described in the following. For the purpose of stopping magnetic sheet 12 at a specified position for magnetic recording or reading-out of magnetic stripe 12b, solenoid 24 is energized to attract plunger 25 downward as shown in FIG. 3, against the force of the coil spring 27. Thereupon the connecting member 26 also is pulled down, and in consequence both control lever 19 and vibrating framework 24 turn clockwise. Thereby, force of coil spring 20 causes roller-holding lever 17 to turn clockwise as shown in FIG. 3, and the press roller 18 presses magnetic sheet 12 against fixed piece 31 and locks it in that state.

Thereafter, by means of a motor or the like which is not shown, sliding block 9, with magnetic heads 8a and 8b held in sliding contact with magnetic stripe 12b, is moved in the direction A shown in FIG. 4. Magnetic head 8b is intended for recording, while magnetic head 8a is intended for checking the contents of recording. Since the pressure acting on magnetic sheet 12 is created by the elasticity of coil spring 20, this pressure is not affected by any error in the displacement stroke of plunger 24.

When the magnetic heads 8a and 8b move to the end of magnetic stripe 12b, and the exchange of information is finished, solenoid 24 is de-energized. The elasticity of coil spring 27 raises connecting member 26 and turns control lever 19 and vibrating framework 22 counterclockwise. The turning of control lever 19 is accompanied by a counterclockwise turning of roller-holding lever 17, thereby unlocking the magnetic sheet 12. Meanwhile, roller guide bar 23 of vibrating framework 22 presses down roller 34, while at the same time internal head holder 14' and external head holder 14 make downward movement. Thus magnetic heads 8a and 8b are separated from magnetic stripe 12b; and in this state sliding block 9 is reverted to the start point by a motor or the like. Thereby as roller 34 moves in contact with roller guide bar 23, magnetic heads 8a and 8b move in the state of being separated from magnetic sheet 12.

When the exchange of information through magnetic heads 8a and 8b is to take place at the time of reverting the sliding block 9, the fitting position of the press roller 18 has only to be reversed to the sliding block 9.

In this manner the magnetic sheet 12 is intermittently driven for magnetic recording of each slip. When the tail end of magnetic sheet 12 has passed follower 3, tension lever 5, reaching the end of its stroke, is arrested by stopper pin 6', while tension lever 5 pushes contact S to actuate switch SW, thereby lighting an empty indicator lamp which is not shown.

As described above, according to the present invention, the magnetic sheet is stretched when it is at halt, i.e., when it is ready for magnetic recording, by applying back tension to the magnetic sheet by a counterclockwise force imparted to the follower or by applying tension to the magnetic sheet by a frictional means or the like. Therefore, the magnetic heads and the magnetic stripe reliably are brought opposite to each other, and the magnetic sheet remains immovable when the magnetic heads slide in contact with the magnetic sheet. Thus, the present invention gives an effect of assuring reliability of magnetic recording action.

Moreover, according to the present invention, after the magnetic sheet is locked by pressing it against a fixed piece before the action starting point of the magnetic head, the magnetic head is operated for exchange of information. The magnetic sheet reliably is pressed and locked without producing any slack or crumple of the magnetic sheet for exact transmission of information.

While the invention has been described with reference to a specific embodiment, modification and variations may be made without departing from the scope of the invention. The scope of the invention is defined in the following claims.

What is claimed is:

1. Magnetic sheet reader apparatus comprising intermittent driving means connected to a sheet for intermittently driving a magnetic sheet, tensioning means connected to the sheet for tensioning the magnetic sheet, magnetic head means mounted between the driving means and the tensioning means for communicating between the head means and the sheet, and moving means connected to the head means for moving the head means in a direction parallel to a plane of the sheet.

2. The magnetic sheet reader apparatus of claim 1 wherein the moving means comprises slide means for sliding the head means across the sheet when the sheet is stopped.

3. Magnetic sheet reader apparatus of claim 1, wherein the tensioning means comprises a rotating follower, a first gear fixed concentrically on said follower, a partial gear meshing with the first gear, and torque means for giving the partial gear a torque in the direction of stretching said magnetic sheet.

4. Magnetic sheet reader apparatus of claim 3 further comprising an empty-detecting switch means mounted adjacent the torque means for operating upon contact of the torque means upon full operation of the torque means in the direction of said partial gear being urged to turn.

5. Magnetic sheet reader apparatus of claim 1, wherein tensioning means comprises a rotary follower, and torque means connected to the follower for applying a weak torque to said rotating follower, thereby stretching said magnetic sheet.

6. Magnetic sheet reader apparatus of claim 1, wherein tensioning means comprises a rotary follower and means for tending to drive the follower in a direction opposite to the driving means.

7. Magnetic sheet reader apparatus of claim 1, further comprising a guide plate mounted adjacent the driving means on an opposite side of the magnetic sheet for lightly pressing the sheet against the driving means.

8. Magnetic sheet reader apparatus of claim 1, wherein the moving means comprises means to slide the head means in contact with the magnetic sheet for exchange of information, and further comprising magnetic sheet press means for pressing and locking the sheet against a fixed piece.

9. Magnetic sheet reader apparatus of claim 8, further comprising operating means connected to the sheet press means to change position of the sheet press means to release the sheet for driving and to press and lock the magnetic sheet for exchange of information.

10. Magnetic sheet reader apparatus of claim 8, wherein the head means comprise magnetic heads and reciprocating means connected to the magnetic heads to reciprocate the heads against said magnetic sheet, whereby exchange of information takes place when said magnetic heads are in contact with said sheet; and when there is no exchange of information, said heads are reciprocated away from said sheet.

11. Magnetic sheet reader apparatus of claim 10, wherein the head means further comprise head holders rotatably pivoted to a sliding block, and means for continuously urging said head holders to move toward the sheet, and wherein the head holders are interlocked with the reciprocating means such that except when the exchange of information takes place the magnetic heads are reciprocated away from the sheet against the urging means.

12. Magnetic sheet reader apparatus of claim 11, further comprising a sliding member attached to the head holders and a roller guide bar selectively contacting said sliding member for causing the magnetic heads in the head holders to move off the sheet when no information is being transmitted.

13. Magnetic sheet reader apparatus of claim 12 wherein the roller guide bar is connected to the reciprocating means and contacts the sliding member attached to the head-holder for setting the magnetic head off the sheet and at the same time keeping the sheet press means off the sheet.

14. Magnetic sheet reader apparatus of claim 9, wherein the sheet press means comprises two mutually independent levers, which are rotatably pivoted and between which is provided a spring means, for providing elasticity to effect the pressing and locking of the magnetic sheet.

15. Magnetic sheet reader apparatus of claim 1 wherein the moving means comprise guide rail means mounted parallel to the magnetic sheet, transverse to a direction of travel of the sheet, a slide mounted on the rail means, and wherein the head means are mounted in the slide.

16. The magnetic sheet reader apparatus of claim 15 further comprising a head holder rotatably connected to the slide and a spring connected between the slide and head holder for urging the head holder toward the magnetic sheet.

17. The magnetic sheet reader apparatus of claim 15 wherein the slide is channel-shaped, with a channel opening toward the magnetic sheet, wherein a support rod extends across the channel at one end, and further comprising a head holder pivoted on the support rod and a spring mounted between the slide and the head holder in the channel for urging the head holder to turn about the support rod in a direction toward the magnetic sheet.

18. The magnetic sheet reader apparatus of claim 17 wherein the head holder comprises an external U-shaped holder having ends of legs of the U connected to the support rod and an internal head holder mounted within the U of the external holder and having one end connected to the support rod, and wherein the spring comprises plural springs, respectively mounted between the internal head holder and the slide in the channel and between the external head holder and the slide in the channel for urging the internal and external head holders in the direction of the magnetic sheet.

19. The magnetic sheet reader apparatus of claim 18 further comprising head disengagement means connected to the head holders and extending downward through the slide for pulling the head holders downward against forces of the springs to disengage the head means from the magnetic sheet.

20. The magnetic sheet reader apparatus of claim 19 wherein a first of the head holders has an underlying projection, and a second of the head holders has a overlying projection, and wherein the disengagement means is connected to the second head holder with the overlying projection, whereby inward pulling of the second head holder against spring force pulls the first head holder inward.

21. The magnetic sheet reader apparatus of claim 19 wherein the disengagement means comprises a holder connected to a head holder and extending downward through the slide and engagement means extending perpendicularly from the holder remote from the head holder, and elongated complementary engagement means for overlying the engagement means, and pulling means for pulling the elongated engagement means inward, whereby the engagement means slides along the elongated complementary engagement means as the slide is moved along the rail means.

22. The magnetic sheet reader apparatus of claim 21 further comprising press means, mounted adjacent the rail means and the magnetic sheet for pressing the magnetic sheet to a holding position, and wherein the press means is connected to the pulling means whereby the pulling means concurrently pulls the press means away from the magnetic sheet and the elongated complementary engagement member.

23. The magnetic sheet reader apparatus of claim 9 wherein the operating means comprises a pivot and an arm rotated at one end on the pivot, and having press means at a distal end, a second arm rotated at one end on the pivot, the second arm extending in a direction opposite the first arm and having a tab overlying the first arm between the pivot and the press means, a coil means mounted about the pivot and connected to the second arm and to the first arm for rotating the first arm with respect to the second arm toward the tab and in a direction of press means engagement with the magnetic sheet and reciprocating means connected to an end of the second arm remote from the pivot for moving the second arm in a direction to move the tab into engagement with the first arm for pulling the first arm and press means in a direction away from the magnetic sheet.

* * * * *